(12) United States Patent
Park

(10) Patent No.: US 9,661,500 B2
(45) Date of Patent: May 23, 2017

(54) METHOD AND ITS APPARATUS FOR BLOCKING ACCESS OF UNAUTHORIZED DEVICE

(71) Applicant: Samsung Electronics Co., Ltd., Gyeonggi-do (KR)

(72) Inventor: Young-June Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 63 days.

(21) Appl. No.: 14/588,756

(22) Filed: Jan. 2, 2015

(65) Prior Publication Data

US 2015/0189573 A1 Jul. 2, 2015

(30) Foreign Application Priority Data

Jan. 2, 2014 (KR) ........................ 10-2014-0000251

(51) Int. Cl.
*H04W 12/08* (2009.01)
*H04W 12/12* (2009.01)
*H04W 72/08* (2009.01)

(52) U.S. Cl.
CPC ........... *H04W 12/08* (2013.01); *H04W 12/12* (2013.01); *H04W 72/085* (2013.01)

(58) Field of Classification Search
CPC .... H04W 12/08; H04W 12/12; H04W 72/085
USPC ..................... 455/26.1, 1, 410, 411
See application file for complete search history.

(56) References Cited

U.S. PATENT DOCUMENTS

| | | | |
|---|---|---|---|
| 2007/0217371 A1 | 9/2007 | Sinha | |
| 2009/0271864 A1 | 10/2009 | Dietrich et al. | |
| 2010/0100930 A1* | 4/2010 | King ................... | H04L 63/1433 726/1 |

* cited by examiner

*Primary Examiner* — Philip Sobutka
(74) *Attorney, Agent, or Firm* — The Farrell Law Firm, P.C.

(57) ABSTRACT

A method and server for blocking access of an unauthorized device in a wireless communication system are provided. The method of the server includes receiving a report in which at least one unauthorized equipment is detected from at least one sensor; determining the at least one sensor to allocate each of the detected at least one unauthorized equipment based on at least one of a number of the at least one unauthorized equipment and a number of channels allocated to each of the at least one sensor; and requesting access blocking of the at least one unauthorized equipment allocated to a corresponding at least one sensor to the determined at least one sensor.

14 Claims, 6 Drawing Sheets

METHOD AND ITS APPARATUS FOR BLOCKING ACCESS OF UNAUTHORIZED DEVICE

PRIORITY

This application claims priority under 35 U.S.C. §119(a) to a Korean Patent Application filed on Jan. 2, 2014 in the Korean Intellectual Property Office and assigned Serial No. 10-2014-0000251, the entire contents of which are incorporated herein by reference.

BACKGROUND

1. Field of the Invention

The present invention relates generally to a wireless communication system, and more particularly, to a method and device for blocking access of an unauthorized device in a wireless communication system.

2. Description of the Related Art

As technology concerning wireless communication system develops, equipment that support wireless communication increase rapidly. Wireless communication equipment may transmit and receive data by connecting to other equipment that supports wireless communication via wireless communication technology. For example, a wireless communication equipment may be connected to a wireless communication server to transmit and receive data to and from another equipment via a server or to directly transmit and receive data to or from a server.

In general, in a wireless communication system, if an illegal wireless communication equipment for which access is not authorized (or allowed) by a server accesses the server, in order for the wireless communication equipment to prevent resources within the server from being used or the server from being damaged, a Wireless Intrusion Prevention System (WIPS) and a Wireless Intrusion Detection System (WIDS) that detect and block access of an unauthorized equipment may be used.

A server of a conventional WIPS/WIDS system may determine whether to block access of an unauthorized equipment via a sensor based on Received Signal Strength Indication (RSSI) from the unauthorized equipment. In more detail, the WIPS/WIDS server is connected to (or includes) a plurality of sensors that monitor an unauthorized equipment, where the sensors may determine a sensor to block access of an unauthorized equipment based on intensity of a signal received from the unauthorized equipment.

However, when a sensor for blocking access of an unauthorized equipment is determined according to RSSI, a plurality of unauthorized equipment may be grouped and allocated to one sensor according to the performance or location of the sensor. That is, unauthorized equipment of a number greater than that of equipment which a sensor can block access may be allocated to another sensor, and in this case, a situation may occur in which the other sensor does not block access of all the unauthorized equipment allocated to it. Further, when a plurality of unauthorized equipment are allocated to a sensor, in order to block access of a plurality of unauthorized equipment, a corresponding sensor may perform a plurality of channel switching, and thus overhead according to the plurality of channel switching may occur.

There is a need for a method of blocking access of a plurality of unauthorized equipment and minimizing the occurrence of overhead due to channel switching when access is blocked.

SUMMARY

The present invention has been made to address at least the above-mentioned problems and/or disadvantages, and to provide at least the advantages described below. Accordingly, an aspect of the present invention is to provide a method and device in which a server of an illegal invasion prevention and illegal invasion detection system determines a sensor to detect an unauthorized equipment and to block access of the unauthorized equipment.

Another aspect of the present invention is to provide a method and device in which a server of an illegal invasion prevention and illegal invasion detection system enables unauthorized equipment access blocking of each sensor by limiting the number of unauthorized equipment that can be allocated to each sensor.

Another aspect of the present invention is to provide a method and device in which a server of an illegal invasion prevention and illegal invasion detection system determines a sensor to perform access blocking of each unauthorized equipment in consideration of the number of unauthorized equipment and the number of channels that can be allocated on a sensor basis and RSSI of an unauthorized equipment which each sensor receives.

In accordance with an aspect of the present invention, a method of a server is provided. The method includes receiving a report in which at least one unauthorized equipment is detected from at least one sensor; determining the at least one sensor to allocate each of the detected at least one unauthorized equipment based on at least one of a number of the at least one unauthorized equipment and a number of channels allocated to each of the at least one sensor; and requesting access blocking of the at least one unauthorized equipment allocated to a corresponding sensor to the determined at least one sensor.

In accordance with another aspect of the present invention, a server is provided. The server includes an unauthorized equipment identity unit configured to determine at least one unauthorized equipment detected by at least one sensor; and an unauthorized equipment allocation unit configured to determine the at least one sensor to allocate to each of the detected at least one unauthorized equipment based on at least one of a number of channels and a number of at least one unauthorized equipment allocated to each of the at least one sensors and that requests access blocking of the at least one unauthorized equipment allocated to a corresponding sensor to the determined at least one sensor.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. Detailed descriptions of well-known functions and structures incorporated herein are omitted to avoid obscuring the subject matter of the present invention. Further, the terms used herein are defined in consideration of functions of the present invention and may vary depending on a user's or an operator's intension and usage. Therefore, the terms used herein should be understood based on the descriptions made herein.

Hereinafter, technology that detects an unauthorized equipment in a Wireless Intrusion Prevention System (WIPS)/Wireless Intrusion Detection System (WIDS) and blocks access of the detected unauthorized equipment is described.

Figure 1:
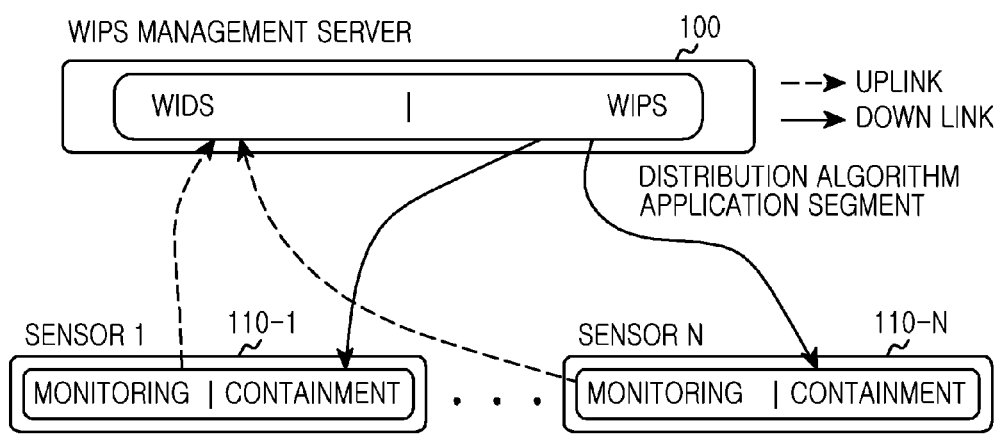
FIG. 1 is a diagram illustrating a system configuration for blocking access of an unauthorized equipment in a WIPS/WIDS server according to an embodiment of the present invention.

FIG. 1 is a diagram illustrating a system configuration for blocking access of an unauthorized equipment in a server according to an embodiment of the present invention.

Referring to FIG. 1, a WIPS/WIDS server 100 performs a function for preventing invasion by an unallowed illegal equipment, i.e., an unauthorized equipment in a wireless Local Area Network (LAN) system. The WIPS/WIDS server 100 receives information about a monitored equipment from a plurality of connected sensors 110-1 to 110-N and determines whether the monitored equipment, i.e., an equipment that requests access is an unauthorized equipment corresponding to a preset rule. If an equipment that requests access is an unauthorized equipment, the WIPS/WIDS server 100 determines a sensor to block access of the corresponding unauthorized equipment and requests access release of the unauthorized equipment to the determined sensor. In this case, sensors 110-1 to 110-N each block access blocking of the corresponding unauthorized equipment according to the request of the WIPS/WIDS server 100. In this case, the unauthorized equipment may be a wireless Local Area Network (LAN) terminal or a wireless LAN Access Point (AP).

The WIPS/WIDS server 100 receives monitoring information of a plurality of equipment that request access from a plurality of sensors 110-1 to 110-N, determines whether an equipment monitored by the plurality of sensors 110-1 to 110-N is an unauthorized equipment, determines a sensor to block access of the unauthorized equipment based on at least one of the number of unauthorized equipment and the number of channels allocated to each sensor, and requests access blocking of a corresponding unauthorized equipment to each sensor.

The plurality of sensors 110-1 to 110-N monitors wireless communication equipment that request access and transmits a result of monitoring to the WIPS/WIDS server 100. In this case, the monitoring result includes RSSI from the wireless communication equipment and identification information and channel information of the wireless communication equipment. Further, the plurality of sensors 110-1 to 110-N receive an access blocking request of the unauthorized equipment from the WIPS/WIDS server 100 and block access of the unauthorized equipment. Each sensor includes a monitor module and an access blocking module, and the monitor module and the access blocking module may be formed in one integrated circuit, or chip, or a plurality of chips.

Figure 2:
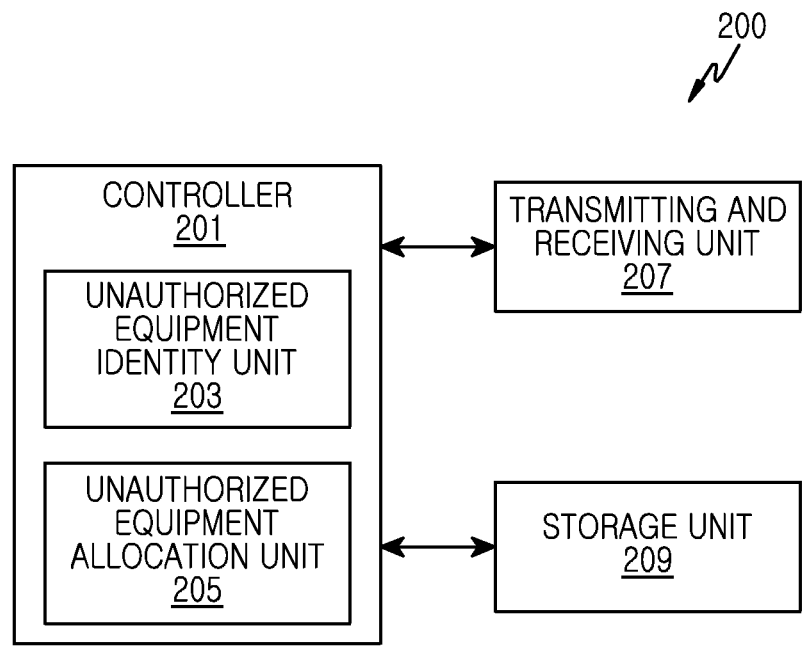
FIG. 2 is a block diagram illustrating a configuration of a server for blocking access of a WIPS/WIDS unauthorized equipment according to an embodiment of the present invention.

FIG. 2 is a block diagram illustrating a configuration of a server 200 for blocking access of an unauthorized equipment according to an embodiment of the present invention.

Referring to FIG. 2, the server 200 includes a controller 201, a transmitting and receiving unit 207, and a storage unit 209.

The controller 201 controls and processes general operations of the server 200 for determining a sensor to block access of each unauthorized equipment. Particularly, the controller 201 identifies an unauthorized equipment via an unauthorized equipment identity unit 203 and determines a sensor to block access of the unauthorized equipment. Thereafter, the controller 201 determines to which sensor of a plurality of sensors to allocate the unauthorized equipment via an unauthorized equipment allocation unit 205 and provides allocation information to the transmitting and receiving unit 207.

The unauthorized equipment identity unit 203 determines whether a corresponding equipment is an unauthorized equipment based on information about the equipment received from a sensor via the transmitting and receiving unit 207. In more detail, when information about a monitored equipment is received from a sensor via the transmitting and receiving unit 207, the unauthorized equipment identity unit 203 compares information about the corresponding equipment and an unauthorized equipment list previously stored in the storage unit 209 and determines whether the corresponding equipment is an unauthorized equipment. For example, the unauthorized equipment identity unit 203 determines whether a corresponding equipment is an unauthorized equipment based on device information or IDentification (ID) information of an equipment received via the transmitting and receiving unit 207.

The unauthorized equipment allocation unit 205 determines a sensor to block access of an unauthorized equipment based on at least one of the number of unauthorized equipment and the number of channels allocated to each sensor.

First, the unauthorized equipment allocation unit 205 aligns unauthorized equipment based on the number of sensors, having detected respective unauthorized equipment. In other words, the unauthorized equipment allocation unit 205 determines the number of sensors having detected each unauthorized equipment and aligns the unauthorized equipment in order of the number of sensors that detected the unauthorized equipment, from the least to the greatest number of sensors that detected the unauthorized equipment. For example, when a first unauthorized equipment is detected by four sensors, a second unauthorized equipment is detected by two sensors, and a third unauthorized equipment is detected by three sensors, the unauthorized equipment allocation unit 205 aligns the unauthorized equipment in order of the second unauthorized equipment, the third unauthorized equipment, and the first unauthorized equipment.

The unauthorized equipment allocation unit 205 determines a sensor to block access of respective unauthorized equipment in order in which unauthorized equipment are aligned. For example, when unauthorized equipment are aligned in order of the second unauthorized equipment, the third unauthorized equipment, and the first unauthorized equipment, the unauthorized equipment allocation unit 205 determines a sensor to block access of the second unauthorized equipment first, a sensor to block access of the third unauthorized equipment second, and a sensor to block access of the first unauthorized equipment third. The unauthorized equipment allocation unit 205 selects unauthorized equipment in alignment order of unauthorized equipment and selects a sensor in which an RSSI value of a receiving signal from the selected unauthorized equipment is greatest among sensors, having detected the selected unauthorized equipment as a candidate sensor of the selected unauthorized equipment. If a sensor having detected the selected unauthorized equipment is a candidate sensor, the unauthorized equipment allocation unit 205 determines a corresponding sensor as an access blocking sensor of the selected unauthorized equipment.

The unauthorized equipment allocation unit 205 determines whether to allocate an unauthorized equipment to a corresponding candidate sensor based on at least one of the number of at least one unauthorized equipment allocated to the selected candidate sensor or the number of channels of at least one unauthorized equipment allocated to the selected sensor. For example, the unauthorized equipment allocation unit 205 determines whether to allocate an unauthorized equipment using the same channel as that of the selected unauthorized equipment to the selected candidate sensor.

When an unauthorized equipment using the same channel as that of the selected unauthorized equipment is allocated to the selected candidate sensor, the unauthorized equipment allocation unit 205 determines whether the number of unauthorized equipment using a corresponding channel among unauthorized equipment allocated to the selected candidate sensor is a maximum value. Here, a maximum value may be previously set and may be changed by a system policy. If the number of unauthorized equipment using a corresponding channel is smaller than the maximum value, the unauthorized equipment allocation unit 205 determines the selected candidate sensor as an access blocking sensor of the selected unauthorized equipment, allocate the selected unauthorized equipment to the determined sensor, and request access blocking. If the number of unauthorized equipment using a corresponding channel is the maximum value, the unauthorized equipment allocation unit 205 determines that the selected unauthorized equipment cannot be allocated to the selected candidate sensor, selects a sensor in which an RSSI value of a receiving signal from the selected unauthorized equipment is the next greatest from among the sensors having detected the selected unauthorized equipment as a candidate sensor, and repeats the above-described operation.

When an unauthorized equipment using the same channel as that of the selected unauthorized equipment does not exist in, or is presently not allocated to, the selected candidate sensor, the unauthorized equipment allocation unit 205 determines whether the number of channels allocated to the selected candidate sensor is a maximum value based on channel information of unauthorized equipment allocated to the selected candidate sensor. In this case, when the number of unauthorized equipment allocated to the selected candidate sensor is three, when two unauthorized equipment among three unauthorized equipment uses a channel 3, and when one unauthorized equipment uses a channel 5, the number of channels allocated to the selected candidate sensor is recognized as two. In this case, the maximum value may be previously set and may be changed by a system policy. If the number of channels allocated to the selected candidate sensor is less than the maximum value, the unauthorized equipment allocation unit 205 determines the selected candidate sensor as a sensor to block access of the selected unauthorized equipment, allocates the selected unauthorized equipment to the determined sensor, and requests access blocking. If the number of channels allocated to the selected candidate sensor is the maximum value, the unauthorized equipment allocation unit 205 determines that the selected unauthorized equipment cannot be allocated to the selected candidate sensor, selects a sensor in which an RSSI value of a receiving signal from the selected unauthorized equipment is next greatest among the sensors having detected the selected unauthorized equipment, and repeats the above-described operation.

The transmitting and receiving unit 207 controls and processes a function for communicating with a plurality of sensors according to the control of the controller 201. In more detail, the transmitting and receiving unit 207 receives information about a monitored equipment from a plurality of sensors connected to the server 200 and requests access blocking of a specific unauthorized equipment to each of the plurality of sensors. In this case, the transmitting and receiving unit 207 is formed in a module, but may be separately formed into a transmitting unit and a receiving unit according to a design method.

The storage unit 209 stores various data and programs necessary for operation of the server 200. The storage unit 209, according to an embodiment of the present invention, stores an equipment list that can be used to determine whether an equipment monitored from a sensor is an authorized equipment or an unauthorized equipment. For example, the storage unit 209 stores an unauthorized equipment list for determining whether a monitored equipment is unauthorized. For another example, the storage unit 209 may store an authorized equipment list for determining whether a monitored equipment is authorized.

Figure 3A:
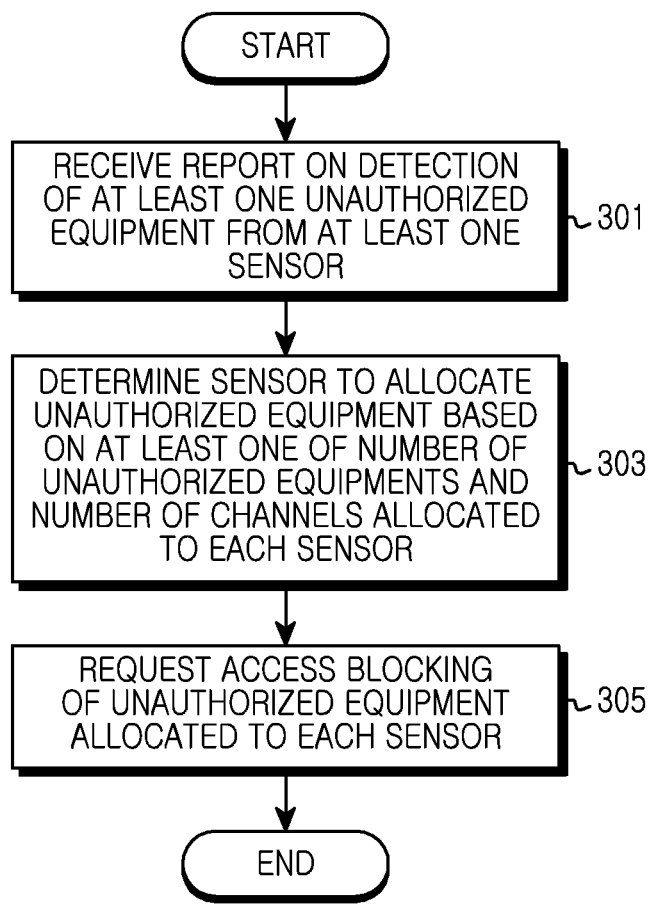
FIG. 3A is a flowchart illustrating a method of blocking access of an unauthorized equipment in a WIPS/WIDS server according to an embodiment of the present invention.

FIG. 3A is a flowchart illustrating a procedure for blocking access of an unauthorized equipment in a server according to an embodiment of the present invention.

Referring to FIG. 3A, the server 200 receives a report on detection of at least one unauthorized equipment from at least one sensor in step 301. For example, the server 200 receives information about an equipment detected by at least one sensor connected to the server 200, compares information of the detected equipment and a previously stored unauthorized equipment list, and determines whether the detected equipment is an unauthorized equipment. In this case, information about the detected equipment includes RSSI from a wireless communication equipment and identification information and channel information of a wireless communication equipment.

Then, the server 200 determines a sensor to allocate an unauthorized equipment based on at least one of the number of unauthorized equipment and the number of channels allocated to each sensor in step 303. For example, the server 200 determines a sensor to block access of each of the unauthorized equipment so that a plurality of unauthorized equipment are not intensively allocated to one sensor and unauthorized equipment are uniformly allocated to a plurality of sensors in consideration of the number of maximum unauthorized equipment and the number of maximum channels that can be allocated to each sensor. For example, the server 200 allocates a maximum of two channels per sensor and allocates a maximum of two unauthorized equipment per channel.

Then, the server 200 requests access blocking of an unauthorized equipment allocated to a corresponding sensor with the determined sensor in step 305. For example, the server 200 transmits a message that requests access blocking of the detected unauthorized equipment on each sensor basis. In this case, a message that requests access blocking of the unauthorized equipment includes identification information and channel information of an unauthorized equipment allocated to a corresponding sensor.

Figure 3B:
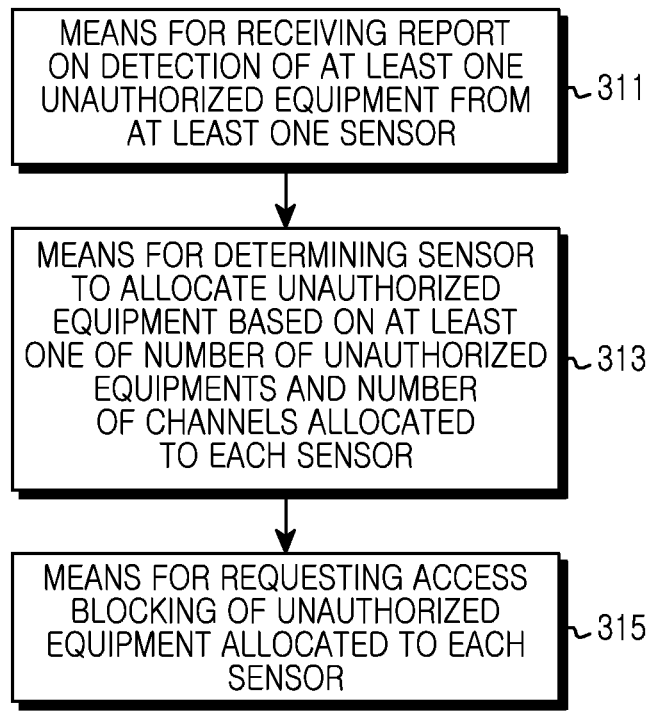
FIG. 3B is a flowchart for blocking access of an unauthorized equipment in a WIPS/WIDS server according to an embodiment of the present invention.

FIG. 3B is a flowchart for blocking access of an unauthorized equipment in a server according to an embodiment of the present invention.

Referring to FIG. 3B, the server 200 includes a means 311 for receiving a report on detection of at least one unauthorized equipment from at least one sensor. In this case, the server 200 includes an unauthorized equipment list for determining whether the detected equipment is an unauthorized equipment.

Further, the server 200 includes a means 313 for determining a sensor to allocate an unauthorized equipment based on at least one of the number of unauthorized equipment and the number of channels allocated to each sensor. The server 200 determines the number of maximum channels that can be allocated to each sensor and includes a means for determining a sensor of each of the unauthorized equipment so that the channel number allocated on each sensor basis does not exceed the number of maximum channels. Alternatively, the server 200 determines the number of maximum unauthorized equipment that can be allocated to each channel and includes a means for determining a sensor of each of the unauthorized equipment so that the number of unauthorized equipment allocated on each channel basis does not exceed the number of maximum unauthorized equipment.

Further, the server 200 includes a means 315 for requesting access blocking of an unauthorized equipment allocated to a corresponding sensor with a determined sensor. The server 200 includes a means that transmits a message that requests access blocking of the detected unauthorized equipment on each sensor basis. In this case, a message that requests access blocking of the unauthorized equipment includes identification information and channel information of the unauthorized equipment allocated to a corresponding sensor.

Figure 4:
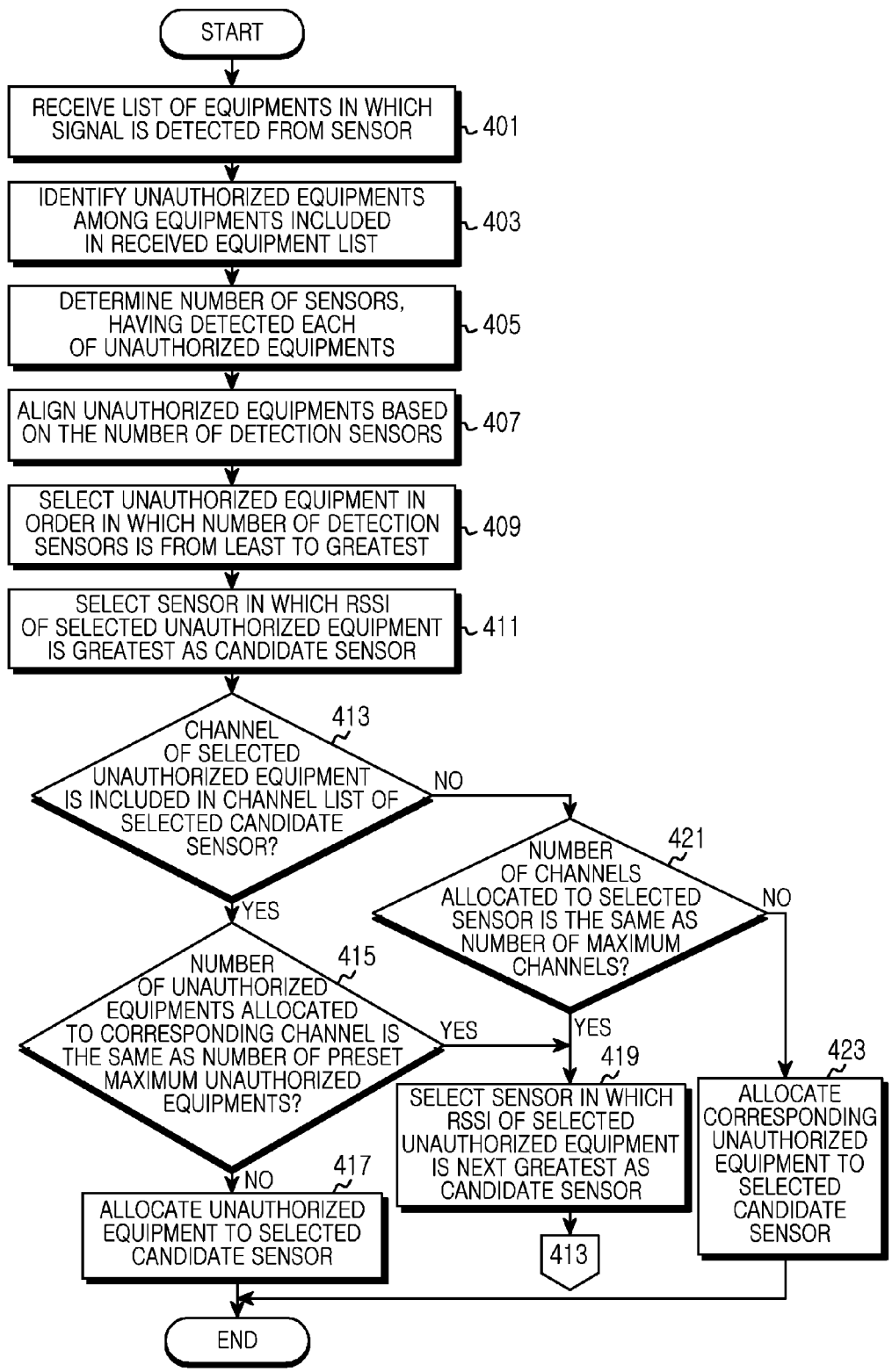
FIG. 4 is a flowchart illustrating a method of searching for an unauthorized equipment and blocking access thereof in a WIPS/WIDS server according to an embodiment of the present invention.

FIG. 4 is a flowchart illustrating a method of identifying an unauthorized equipment and blocking access of the identified unauthorized equipment in a server according to an embodiment of the present invention.

Referring to FIG. 4, the server 200 receives a list of equipment in which a signal is detected by a sensor in step 401. In other words, the server 200 receives a list including information about equipment that request access from a plurality of sensors connected to the server 200. In this case, the received equipment list includes device information or ID information of equipment that request access.

Then, the server 200 identifies unauthorized equipment among equipment included in the received equipment list in step 403. For example, the server 200 compares equipment included in the equipment list and a previously stored authorized equipment list, thereby identifying whether a corresponding equipment is an equipment authorized by the server 200 or an unauthorized equipment.

Then, the server 200 determines the number of sensors having detected each of unauthorized equipment in step 405. In other words, the server 200 determines whether detected unauthorized equipment have been detected and, if so, by how many sensors. For example, when a first unauthorized equipment is detected by a first sensor, a second sensor, and a fourth sensor, the server 200 determines that the first unauthorized equipment has been detected by three sensors.

Then, the server 200 aligns unauthorized equipment based on the number of detection sensors in step 407 and selects unauthorized equipment in an order in which the number of detection sensors is from least to greatest in step 409. For example, when two sensors detect the first unauthorized equipment, four sensors detect a second unauthorized equipment, and three sensors detect a third unauthorized equipment, the server 200 aligns unauthorized equipment in order of the first unauthorized equipment, the third unauthorized equipment, and the second unauthorized equipment, and selects the first unauthorized equipment according to the aligned order.

Then, the server 200 selects a sensor in which RSSI of the selected unauthorized equipment is greatest in step 411. For example, when at least two sensors detect the selected unauthorized equipment, the server 200 selects the sensor in which an RSSI value of a receiving signal from a corresponding unauthorized equipment is greatest among the at least two sensors having detected the unauthorized equipment as a candidate sensor.

Then, the server 200 determines whether a channel of the unauthorized equipment is included in a channel list of the selected candidate sensor in step 413. In this case, a channel list of the selected candidate sensor is a list representing channels used by unauthorized equipment allocated to the selected candidate sensor. For example, when a previously allocated at least one unauthorized equipment exists in the selected candidate sensor (i.e., is allocated to the selected candidate sensor), the server 200 determines whether an unauthorized equipment using the same channel as that of the selected unauthorized equipment exists among previously allocated at least one unauthorized equipment. In this case, if a previously allocated unauthorized equipment using the same channel as the selected unauthorized equipment does not exist in the selected candidate sensor, the server 200 determines that a channel of the selected unauthorized equipment is not included in a channel list of the selected candidate sensor.

If a channel of the selected unauthorized equipment is included in a channel list of the selected candidate sensor, the server 200 determines whether the number of unauthorized equipment allocated to a corresponding channel is the same as the number of preset maximum unauthorized equipment in step 415. In this case, the number of maximum unauthorized equipment is the number of unauthorized equipment that can be allowed on each channel basis, and the number of maximum unauthorized equipment may be previously set in consideration of a channel capacity and may be changed by a provider policy.

If the number of unauthorized equipment allocated to a corresponding channel is not the same as (i.e., is less than) the number of preset maximum unauthorized equipment, the server 200 determines the selected candidate sensor as a sensor to block access of the selected unauthorized equipment and allocates the unauthorized equipment to the selected candidate sensor in step 417. For example, when the number of unauthorized equipment allocated to a corresponding channel is less than the number of maximum unauthorized equipment, the server 200 allocates the selected unauthorized equipment to the selected candidate sensor and requests access blocking of the selected unauthorized equipment.

Thereafter, the server 200 terminates the method according to an embodiment of the present invention.

If the number of unauthorized equipment allocated to a corresponding channel is the same as the number of preset maximum unauthorized equipment in step 415, the server 200 selects a sensor in which RSSI of the selected unauthorized equipment is next greatest in step 419. For example, when at least two sensors detected the selected unauthorized equipment, the server 200 selects the sensor in which an RSSI value of a receiving signal from a corresponding unauthorized equipment among the at least two sensors having detected the unauthorized equipment is next greatest after a presently selected candidate sensor as a candidate sensor. Thereafter, the method returns to step 413 and the server 200 repeats the following steps.

If a channel of the selected unauthorized equipment is not included in a channel list of the selected candidate sensor in step 413, the server 200 determines whether the number of channels allocated to the selected sensor is the same as the number of maximum channels in step 421. In this case, the number of maximum channels that can be allocated to each sensor may be previously set and may be changed according to a system policy.

If the number of channels allocated to the selected candidate sensor is the same as the number of maximum channels, the server 200 selects a sensor in which RSSI of the selected unauthorized equipment is next greatest in step 419. For example, when more than one sensor detected the selected unauthorized equipment, the server 200 selects the sensor in which an RSSI value of a receiving signal from a corresponding unauthorized equipment among the plurality of sensors having detected the unauthorized equipment is next greatest after a presently selected candidate sensor as a candidate sensor. Thereafter, the process returns to step 413 and the server 200 repeats the following steps.

If the number of channels allocated to the selected candidate sensor is not the same as the number of maximum channels in step 421, the server 200 determines the selected candidate sensor as a sensor to block access of the selected unauthorized equipment and allocates a corresponding unauthorized equipment to the selected candidate sensor in step 423. In other words, when the number of channels allocated to the selected sensor is less than the number of maximum channels, the server 200 allocates the selected unauthorized equipment to the selected candidate sensor and requests access blocking of the selected unauthorized equipment.

Thereafter, the server 200 terminates the method according to an embodiment of the present invention.

Figure 5:
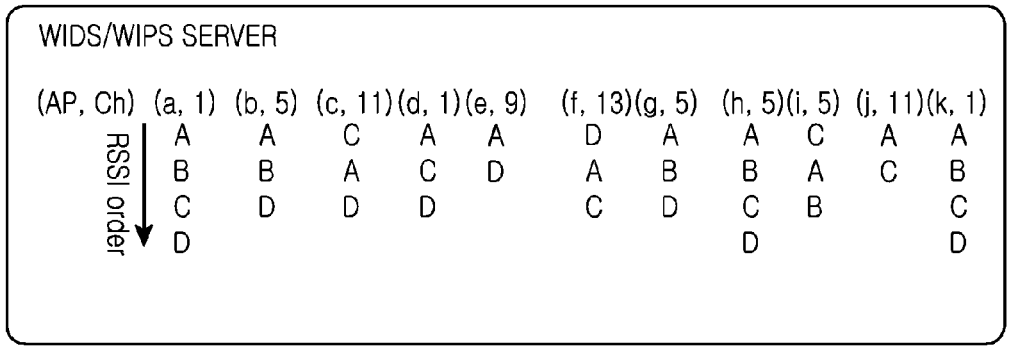
FIG. 5 is a diagram illustrating an example in which a WIPS/WIDS server allocates an unauthorized equipment to each sensor according to an embodiment of the present invention.
Figure 5:
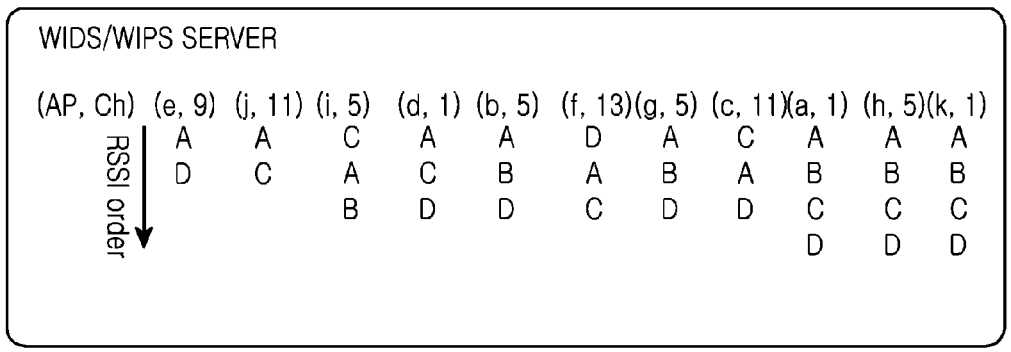
Figure 5:
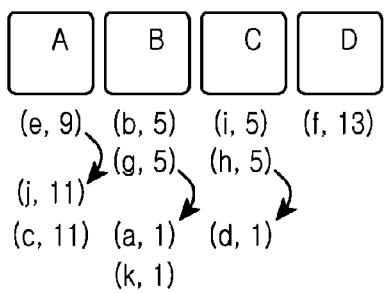

FIG. 5 illustrates an example in which a server allocates an unauthorized equipment to a sensor according to an embodiment of the present invention.

Referring to FIG. 5, the server 200 receives a report from four sensors, i.e., sensors A, B, C, D, that an unauthorized equipment a is using a first channel, an unauthorized equipment b is using a fifth channel, an unauthorized equipment c is using an eleventh channel, an unauthorized equipment d is using a first channel, an unauthorized equipment e is using a ninth channel, an unauthorized equipment f is using a thirteenth channel, an unauthorized equipment g is using a fifth channel, an unauthorized equipment h is using a fifth channel, an unauthorized equipment i is using a fifth channel, an unauthorized equipment j is using an eleventh channel, and an unauthorized equipment k is using a first channel are detected.

The server 200 aligns unauthorized equipment in an order in which the number of sensors that detected an unauthorized equipment from least to greatest. When unauthorized equipment in which the number of sensors having detected an unauthorized equipment is the same exist, the server 200 aligns unauthorized equipment in order in which a detected time of unauthorized equipment is the shortest. Accordingly, the server 200 may align the detected unauthorized equipment in order of e, j, i, d, b, f, g, c, a, h, and k.

Then, in order to allocate the unauthorized equipment e to the sensor A in which RSSI of the unauthorized equipment e is greatest, the server 200 determines a channel allocated to the sensor A. The server 200 determines that the number of channels of an unauthorized equipment allocated to the sensor A is 0, which is less than a maximum value, and allocates the unauthorized equipment e to a channel 9 of a corresponding sensor.

Then, in order to allocate the unauthorized equipment e to the sensor A in which RSSI of the unauthorized equipment j is greatest, the server 200 determines a channel allocated to the sensor A. The server 200 determine that the number of channels of the unauthorized equipment allocated to the sensor A is 1, which is less than a maximum value, and determines whether one channel allocated to the sensor A is the same channel as that of the unauthorized equipment e. The server 200 determines that a channel allocated to the sensor A is a channel different from a channel 11 of the unauthorized equipment e and allocates the unauthorized equipment j to the channel 11 of the sensor A.

Then, in order to allocate the unauthorized equipment i to the sensor C in which RSSI of the unauthorized equipment i is greatest, the server 200 determines a channel allocated to the sensor C. The server 200 determines that the number of channels of an unauthorized equipment allocated to the sensor C is 0, which is less than a maximum value, and allocates the unauthorized equipment i to a channel 5 of the sensor C.

Then, in order to allocate the unauthorized equipment d to the sensor A in which RSSI of the unauthorized equipment d is largest, the server 200 determines a channel allocated to the sensor A. The server 200 determines that the number of channels of the unauthorized equipment allocated to the sensor A is 2, which is a maximum value, and determines whether the same channel as that of the unauthorized equipment d exists among the two channels allocated to the sensor A. The server 200 determines that the same channel as that of the unauthorized equipment d does not exist among the two channels allocated to the sensor A and determines a channel allocated to the sensor C in which RSSI of the equipment d is next greatest. The server 200 determines that the number of channels of the unauthorized equipment allocated to the sensor C is 1, which is less than a maximum value, and determines whether one channel allocated to the sensor C is the same channel as that of the unauthorized equipment d. The server 200 determines that a channel allocated to the sensor C is a channel different from a channel of the unauthorized equipment d and allocates the unauthorized equipment d to the channel 1 of the sensor C.

Then, in order to allocate the unauthorized equipment b to the sensor A in which RSSI of the unauthorized equipment b is greatest, the server 200 determines a channel allocated to the sensor A. The server 200 determines that the number of channels of the unauthorized equipment allocated to the sensor A is 2, which is a maximum value, and determines whether the same channel as that of the unauthorized equipment b exists among the two channels allocated to the sensor A. The server 200 determines that the same channel as that of the unauthorized equipment b does not exist among the two channels allocated to the sensor A and determines a channel allocated to the sensor B in which RSSI of the equipment b is next greatest. The server 200 determines that the number of channels of an unauthorized equipment allocated to the sensor B is 0, which is less than a maximum value, and allocates the unauthorized equipment b to the channel 5 of the sensor B.

Thereafter, in order to allocate the unauthorized equipment f to the sensor D in which RSSI of the unauthorized equipment f is greatest, the server 200 determines a channel allocated to the sensor D. The server 200 determines that the number of channels of an unauthorized equipment allocated to the sensor D is 0, which is smaller than a maximum value, and allocates the unauthorized equipment f to the channel 13 of the sensor D.

Then, in order to allocate the unauthorized equipment g to the sensor A in which RSSI of the unauthorized equipment g is largest, the server 200 determines a channel allocated to the sensor A. The server 200 determines that the number of channels of the unauthorized equipment allocated to the sensor A is 2, which is a maximum value, and determines whether the same channel as that of the unauthorized equipment g exists among the two channels allocated to the sensor A. The server 200 determines that the same channel as that of the unauthorized equipment g does not exist among the two channels allocated to the sensor A and determines a channel allocated to the sensor B in which RSSI of the equipment g is next greatest. The server 200 determines that the number of channels of the unauthorized equipment allocated to the sensor B is 1, which is smaller than a maximum value, and determines whether a channel allocated to the sensor B is the same channel as that of the unauthorized equipment g. The server 200 determines that one channel allocated to the sensor B is a channel 5, which is the same channel as that of the unauthorized equipment g, and determines the number of unauthorized equipment allocated to the channel 5. The server 200 determines that the number of unauthorized equipment allocated to the channel 5 is 1, which is smaller than a maximum value, and allocates the unauthorized equipment g to a channel 5 of the sensor B.

Then, in order to allocate the unauthorized equipment c to the sensor C in which RSSI of the unauthorized equipment C is greatest, the server 200 determines a channel allocated to the sensor C. The server 200 determines that the number of channels of the unauthorized equipment allocated to the sensor C is 2, which is smaller than a maximum value, and determines whether the same channel as that of the unauthorized equipment exists among the two channels allocated to the sensor C. The server 200 determines that the same channel as that of the unauthorized equipment c does not exist among the two channels allocated to the sensor C and determines a channel allocated to the sensor A in which RSSI of the equipment c is next greatest. The server 200 determines that the number of channels of the unauthorized equipment allocated to the sensor A is 2, which is a maximum value, and determines whether the same channel as that of the unauthorized equipment exists among the two channels allocated to the sensor A. The server 200 determines that a channel 11, which is the same channel as that of the unauthorized equipment c, exists among two channels allocated to the sensor A and determines the number of unauthorized equipment allocated to the channel 11. The server 200 determines the number of unauthorized equipment allocated to the channel 11 is 1, which is smaller than a maximum value, and allocates the unauthorized equipment c to the channel 11 of the sensor A.

Then, in order to allocate the unauthorized equipment a to the sensor A in which RSSI of the unauthorized equipment a is greatest, the server 200 determines a channel allocated to the sensor A. The server 200 determines that the number of channels of the unauthorized equipment allocated to the sensor A is 2, which is a maximum value, and determines whether the same channel as that of the unauthorized equipment a exists among the two channels allocated to the sensor A. The server 200 determines that the same channel as that of the unauthorized equipment a does not exist among the two channels allocated to the sensor A and determines a channel allocated to the sensor B in which RSSI of the equipment a is next greatest. The server 200 determines that the number of channels of the unauthorized equipment allocated to the sensor B is 1, which is smaller than a maximum value, and determines whether a channel allocated to the sensor B is the same channel as that of the unauthorized equipment a. The server 200 determines that a channel allocated to the sensor B is a channel different from a channel of the unauthorized equipment a and allocates the unauthorized equipment a to the channel 1 of the sensor B.

Then, in order to allocate the unauthorized equipment h to the sensor A in which RSSI of the unauthorized equipment h is greatest, the server 200 determines a channel allocated to the sensor A. The server 200 determines that the number of channels of the unauthorized equipment allocated to the sensor A is 2, which is a maximum value, and determines whether the same channel as that of the unauthorized equipment h exists among the two channels allocated to the sensor A. The server 200 determines that the same channel as that of the unauthorized equipment h does not exist among the two channels allocated to the sensor A and determines a channel allocated to the sensor B in which RSSI of the equipment h is next greatest. The server 200 determines that the number of channels of the unauthorized equipment allocated to the sensor B is 2, which is a maximum value, and determines whether the same channel as that of the unauthorized equipment h exists among the two channels allocated to the sensor B. The server 200 determines that the same channel as that of the unauthorized equipment h does not exist among the two channels allocated to the sensor B and determines a channel allocated to the sensor C in which RSSI of the equipment h is next greatest. The server 200 determines that the number of channels of the unauthorized equipment allocated to the sensor C is 2, which is a maximum value, and determines whether the same channel as that of the unauthorized equipment h exists among the two channels allocated to the sensor C. The server 200 determines that a channel 5, which is the same channel as that of the unauthorized equipment h, exists among the two channels allocated to the sensor C and determines the number of unauthorized equipment allocated to the channel 5. The server 200 determines that the number of unauthorized equipment allocated to the sensor 5 is 1, which is smaller than a maximum value, and allocates the unauthorized equipment h to the channel 5 of the sensor C.

Thereafter, in order to allocate the unauthorized equipment k to the sensor A in which RSSI of the unauthorized equipment k is greatest, the server 200 determines a channel allocated to the sensor A. The server 200 determines that the number of channels of the unauthorized equipment allocated to the sensor A is 2, which is a maximum value, and determines whether the same channel as that of the unauthorized equipment k exists among the two channels allocated to the sensor A. The server 200 determines that the same channel as that of the unauthorized equipment k does not exist among the two channels allocated to the sensor A and determines a channel allocated to the sensor B in which RSSI of the equipment k is next greatest. The server 200 determines that the number of channels of the unauthorized equipment allocated to the sensor B is 2, which is a maximum value, and determines whether the same channel as that of the unauthorized equipment k exists among the two channels allocated to the sensor B. The server 200 determines that a channel 1, which is the same channel as that of the unauthorized equipment k, exists among the two channels allocated to the sensor B and determines the number of unauthorized equipment allocated to the channel 1. The server 200 determines that the number of unauthorized equipment allocated to the sensor 1 is 1, which is smaller than a maximum value, and allocates the unauthorized equipment k to a channel 1 of the sensor B.

Then, after the entire unauthorized equipment are allocated to respective sensors, the server 200 transmits an access blocking request message of an unauthorized equipment including unauthorized equipment allocation information to the respective sensors.

In the foregoing description, a method of determining whether an unauthorized equipment can be additionally allocated to each sensor based on the number of channels allocated to each sensor and the number of unauthorized equipment using each channel is described. However, according to another embodiment of the present invention, it may be determined whether an unauthorized equipment can be additionally allocated to each sensor based on entire numbers of unauthorized equipment allocated to each sensor. For example, while the number of channels allocated to each sensor does not exceed the number of maximum channels, the number of entire unauthorized equipment allocated to a corresponding sensor regardless of a channel may be controlled not to exceed a preset maximum number.

An embodiment of the present invention and the entire functional operations described in this specification may be executed with computer software, firmware, or hardware, or at least one combination thereof including a structure disclosed in this specification and equivalent structures thereof. Further, embodiments of the present invention described in this specification may be executed by at least one computer program product, i.e., a data processing device or may be executed with at least one module of computer program commands encoded on a non-transitory computer readable medium for controlling operation of the device.

The non-transitory computer readable medium may be a configuration of a material or at least one combination thereof that has an influence on a machine readable storage medium, a machine readable storage substrate, a memory device, and a machine readable radio wave stream. A term of a data processing device includes, for example, an entire node, device, and machine for processing data including a programmable processor, a computer, or a multiple processor or computer. The node may include a code, for example, a code that configures processor firmware, a protocol stack, a database management system, an operation system, or at least one combination thereof that generates an execution environment of a corresponding computer program by adding to hardware.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a server, the method comprising:
   receiving, from at least one sensor, a report including information regarding a plurality of unauthorized equipment being detected by the at least one sensor;
   determining, based on an alignment order of the plurality of unauthorized equipment, a sensor among the at least one sensor;
   determining, based on a number of channels allocated to the determined sensor, at least one unauthorized equipment allocated to the determined sensor, among the plurality of unauthorized equipment; and
   transmitting, to the determined sensor, a message requesting blocking access of the at least one unauthorized equipment.

2. The method of claim 1,
   wherein determining the sensor among the at least one sensor comprises:
   determining a number of the at least one sensor detecting the plurality of unauthorized equipment;
   aligning the plurality of unauthorized equipment in an order in which the number of the at least one sensor detecting the plurality of unauthorized equipment is from least to greatest;
   selecting, among the plurality of unauthorized equipment, an unauthorized equipment in an aligned order; and
   determining a sensor detecting the selected unauthorized equipment as the sensor among the at least one sensor.

3. The method of claim 2, wherein determining the sensor among the plurality of unauthorized equipment further comprises
   selecting a sensor in which a received signal strength indication (RSSI) value from the selected unauthorized equipment is greatest among the other sensors detecting the select unauthorized equipment, and
   wherein determining the at least one unauthorized equipment allocated to the determined sensor comprises:
   determining whether an unauthorized equipment is allocated to the selected sensor based on at least one of a number of channels and a number of at least one unauthorized equipment previously allocated to the selected sensor; and
   determining, if the unauthorized equipment is allocated to the selected sensor, the unauthorized equipment as the unauthorized equipment allocated to the selected sensor.

4. The method of claim 3, further comprising:
   selecting another of the at least one sensor in which an RSSI value from the selected unauthorized equipment is next greatest, if the unauthorized equipment is not allocated to the selected sensor; and
   repeating the method to determine whether the unauthorized equipment is allocated to the another of the at least one sensor.

5. The method of claim 3, wherein determining whether the unauthorized equipment is allocated to the selected sensor comprises:
   determining whether an unauthorized equipment using a same channel as that of the selected at least one unauthorized equipment exists among at least one unauthorized equipment previously allocated to the selected sensor;
   comparing a number of the at least one unauthorized equipment using the same channel among the previously allocated at least one unauthorized equipment and a number of preset maximum equipment, if the unauthorized equipment using the same channel as that of the selected at least one unauthorized equipment exists;

determining that the unauthorized equipment is allocated to the selected sensor, if the number of the at least one unauthorized equipment is less than the number of preset maximum equipment; and determining that the unauthorized equipment is not allocated to the selected sensor, if the number of the at least one unauthorized equipment is the same as the number of the preset maximum equipment.

6. The method of claim 5, further comprising:

determining the number of channels allocated to the selected sensor using channel information of the previously allocated at least one unauthorized equipment, if the unauthorized equipment using the same channel as that of the selected at least one unauthorized equipment does not exist;

comparing the number of channels allocated to the selected sensor and a number of preset maximum channels;

determining that the unauthorized equipment is allocated to the selected sensor, if the number of channels allocated to the selected sensor is less than the number of preset maximum channels; and determining that the unauthorized equipment is not allocated to the selected sensor, if the number of channels allocated to the selected sensor is the same as the number of preset maximum channels.

7. The method of claim 3, wherein determining whether the unauthorized equipment is allocated to the selected sensor comprises:

comparing the number of at least one unauthorized equipment previously allocated to the selected sensor with a number of preset entire unauthorized equipment;

determining that the unauthorized equipment is allocated to the selected sensor, if the number of at least one unauthorized equipment previously allocated to the selected sensor is less than the number of preset entire unauthorized equipment; and determining that the unauthorized equipment is not allocated to the selected sensor, if the number of at least one unauthorized equipment previously allocated to the selected sensor is the same as the number of preset entire unauthorized equipment.

8. A server, comprising:

a transceiver; and a controller configured to:

receive, from at least one sensor, a report including information regarding a plurality of unauthorized equipment detected by the at least one sensor, determine, based on an alignment order of the plurality of unauthorized equipment, a sensor among the at least one sensor;

determine, based on a number of channels allocated to the determined sensor, at least one unauthorized equipment allocated to the determined sensor, among the plurality of unauthorized equipment, and transmit, to the sensor, a message requesting blocking access of the at least one unauthorized equipment.

9. The server of claim 8, wherein the controller is further configured to determine the sensor among the at least one sensor by:

determining a number of at least one sensor detecting the plurality of unauthorized equipment;

aligning the plurality of unauthorized equipment in an order in which the number of the at least one sensor detecting the plurality of unauthorized equipment is from least to greatest;

selecting, among the plurality of unauthorized equipment, an unauthorized equipment in an aligned order; and determining a sensor detecting the unauthorized equipment as the sensor among the at least one sensor.

10. The server of claim 9, wherein the controller is further configured to:

select a sensor in which a received signal strength indication (RSSI) value from the selected unauthorized equipment is greatest among the other sensors detecting the selected unauthorized equipment;

determine whether an unauthorized equipment is allocated to the selected sensor based on at least one of a number of channels and a number of at least one unauthorized equipment previously allocated to the selected sensor; and determine unauthorized equipment as the unauthorized equipment allocated to the selected sensor, if the unauthorized equipment is allocated to the selected sensor.

11. The server of claim 10, wherein the controller is further configured to:

select another of the at least one sensor in which an RSSI value from the selected unauthorized equipment is next greatest, if the unauthorized equipment is not allocated to the selected sensor; and determine whether the unauthorized equipment is allocated to the another of the at least one sensor.

12. The server of claim 10, wherein the controller is further configured to:

determine whether an unauthorized equipment using a same channel as that of the selected at least one unauthorized equipment exists among at least one unauthorized equipment previously allocated to the selected sensor;

compare a number of at least one unauthorized equipment using the same channel among the previously allocated at least one unauthorized equipment with a number of preset maximum equipment, if the unauthorized equipment using the same channel as that of the selected at least one unauthorized equipment exists;

determine that the unauthorized equipment is allocated to the selected sensor, if the number of at least one unauthorized equipment is less than the number of preset maximum equipment; and determine that the unauthorized equipment is not allocated to the selected sensor, if the number of the at least one unauthorized equipment is the same as the number of preset maximum equipment.

13. The server of claim 12, wherein the controller is further configured to:

determine the number of channels allocated to the selected sensor using channel information of the previously allocated at least one unauthorized equipment, if the unauthorized equipment using the same channel as that of the selected at least one unauthorized equipment does not exist;

compare the number of channels allocated to the selected sensor and a number of preset maximum channels;

determine that the selected at least one unauthorized equipment is allocated to the selected sensor, if the number of channels allocated to the selected sensor is less than the number of preset maximum channels; and determine that the selected at least one unauthorized equipment is not allocated to the selected sensor, if the number of channels allocated to the selected at least one sensor is the same as the number of preset maximum channels.

14. The server of claim 10, wherein the controller is further configured to:
compare the number of at least one unauthorized equipment previously allocated to the selected sensor with a number of preset entire unauthorized equipment;
determine that the unauthorized equipment is allocated to the selected sensor, if the number of at least one unauthorized equipment previously allocated is less than the number of preset entire unauthorized equipment; and
determine that the selected at least one unauthorized equipment is not allocated to the selected sensor, if the number of at least one unauthorized equipment previously allocated is the same as the number of preset entire unauthorized equipment.

\* \* \* \* \*